US007962040B2

(12) United States Patent
Yoshikawa

(10) Patent No.: US 7,962,040 B2
(45) Date of Patent: Jun. 14, 2011

(54) REMOTE CONTROL TRANSMITTER

(75) Inventor: Osamu Yoshikawa, Tokyo (JP)

(73) Assignee: SMK Corporation, Tokyo (JP)

( * ) Notice: Subject to any disclaimer, the term of this patent is extended or adjusted under 35 U.S.C. 154(b) by 722 days.

(21) Appl. No.: 11/942,121

(22) Filed: Nov. 19, 2007

(65) Prior Publication Data

US 2008/0124085 A1 May 29, 2008

(30) Foreign Application Priority Data

Nov. 28, 2006 (JP) ................................ 2006-319585

(51) Int. Cl.
*H04B 10/00* (2006.01)

(52) U.S. Cl. ........................................ 398/106; 398/164

(58) Field of Classification Search .................. 398/106, 398/107, 164
See application file for complete search history.

(56) References Cited

U.S. PATENT DOCUMENTS 5,031,046 A 7/1991 Bruggemann et al.
5,383,044 A * 1/1995 Borchardt et al. ............ 398/111
5,475,381 A 12/1995 Williamson et al.
5,659,299 A * 8/1997 Williamson et al. ..... 340/825.57
6,761,315 B2 * 7/2004 Kato et al. ............... 235/462.45
2007/0052691 A1 * 3/2007 Zadesky et al. ............... 345/173

FOREIGN PATENT DOCUMENTS

DE 100 13 444 10/2000
DE 20 2004 009403 U1 9/2004
JP 2005-252336 9/2005
WO WO-97/27575 7/1997

* cited by examiner

*Primary Examiner* — Dalzid Singh
(74) *Attorney, Agent, or Firm* — Edwards Angell Palmer & Dodge LLP; Peter C. Schechter; Brian R. Landry

(57) ABSTRACT

A remote control transmitter includes a transparent protective filter that covers a light emitting device in the light emitting direction. The filter is formed as a strip shaped, long and thin plate that is made from a transparent material that has a refractive index that is larger at least than that of air. The transparent protective filter, is attached so that it is oriented frontwards from the front surface of the case so that one end surface in the longitudinal directions opposes the light emitting device. The optical control signal that is emitted from the light emitting device is emitted from another end surface of the transparent protective filter, such that the optical control signal is not blocked by the finger that grasps the case, even if that case is formed with a size such that it can be grasped with one hand.

10 Claims, 5 Drawing Sheets

REMOTE CONTROL TRANSMITTER

CROSS-REFERENCE TO RELATED APPLICATION

The present application claims priority under 35 U.S.C. §119 to Japanese Patent Application No. 2006-319585, filed Nov. 28, 2006, and which is hereby incorporated by reference herein in its entirety.

FIELD OF THE INVENTION

The present invention relates to a remote control apparatus that transmits an optical control signal, which comprises infrared rays or the like in response to a control command that is generated in accordance with an input operation and thereby controls a controlled apparatus remotely in accordance with the control command, and more particularly relates to a remote control transmitter wherein a transparent protective filter extends forward from a light emitting device that emits and outputs the optical control signal.

BACKGROUND OF THE INVENTION

In a conventional remote control transmitter that remotely controls the operation of a home appliance, such as a television or an air conditioner, by emitting an optical control signal thereto, the entire case of the transmitter is made in a long and thin shape, and a light emitting device, which emits the optical control signal, is housed in the tip part of the case in the longitudinal direction so that an operator can control the transmission direction of the optical control signal.

The light emitting device that is housed inside the case is covered by a transparent protective filter, which is disposed on and provided to a tip surface of the case so that the light emitting device is not damaged by the operator's finger or by the accidental application of some external force. However, if one attempts to reduce the size of the remote control transmitter to an extent such that it can be grasped with one hand, there then is a risk that the finger of the operator who grasps the case will cover the transparent protective filter and thereby block the optical control signal. Therefore, the conventional remote control transmitter is designed so that the width of the case in the latitudinal direction is of such an extent that it can be grasped with one hand, and the width in the longitudinal direction is of an extent such that the fingers that grasp the case do not reach the tip surface. Such a configuration is disclosed by Japanese Published Unexamined Patent Application No. 2005-252336, which is hereby incorporated by reference in its entirety herein.

A conventional remote control transmitter 100 of this type is illustrated in FIG. 7 and FIG. 8. A case 101, which has a rectangular contour, is formed hollowly by superposing an upper case 101*a* and a lower case 101*b*, which are made of synthetic resin. A printed wiring board 102 is supported inside the hollow case 101, and an infrared light emitting device 103, which emits an infrared control signal that comprises infrared rays, is mounted to a front end (upper end in FIG. 8) of the printed wiring board 102.

Additionally, a plurality of key switches 104 as well as circuit elements, such as a control device 105 that generates a prescribed control command in accordance with a key switch 104 on which an input operation has been performed, are mounted to the printed wiring board 102, and batteries 106, which constitute the drive power source of these circuit elements, are housed in a gap that is between the rear end (the lower end in FIG. 8) of the printed wiring board 102 and the case 101.

The infrared light emitting device 103, which is housed in the front end part of the case 101, emits and outputs an infrared control signal frontwards, and a transparent protective filter 107 is attached to a front surface of the case 101 that intersects the optical path of that infrared control signal. The transparent protective filter 107 transmits the infrared control signal, prevents the infiltration of dust into the case 101, and protects the infrared light emitting device 103, which is housed inside the case 101, from unexpected external forces.

A liquid crystal display panel 108, which displays the results and the like of input operations that are performed on the key switches 104, is mounted to the remote control transmitter 100 between the key switches 104 and the infrared light emitting device 103 of the printed wiring board 102. A transparent protective panel 109 is attached to the face side of the liquid crystal display panel 108 in an area of the upper case 101*a*, and thereby the operator views the display of the liquid crystal display panel 108 through the transparent protective panel 109 while performing a prescribed input operation.

When the operator orients the front end of the remote control transmitter 100 toward a controlled apparatus and performs an input operation on any one of the key switches 104, the control device 105 generates a control command that is in accordance with the key switch 104 on which the input operation was performed, and controls the infrared light emitting device 103 so that it flashes based on the control signal, which is modulated with the control command. Thereby, the infrared light emitting device 103 emits and outputs an infrared control signal that includes the control command to the controlled apparatus through the transparent protective filter 107, and the controlled apparatus demodulates the control command from the infrared control signal and executes an operation that is in accordance with the control command. Furthermore, under the control of the control device 105 the liquid crystal display panel 108 displays information about the control command during this time through the transparent protective panel 109.

With the conventional remote control transmitter 100 discussed above, the infrared light emitting device 103 that emits and outputs the infrared control signal frontwards is housed in the front end part of the case 101, and numerous key switches 104, on which input operations are performed, are disposed and provided to the rear of the case 101. Therefore, the operator naturally grasps the rear of the case 101, and the operator's finger does not cover the transparent protective filter 107, which is disposed and provided to the front surface of the case 101, and the infrared control signal is not blocked accidentally.

Nevertheless, because the case 101 is made so that it is longer than the length of the hand that grips it and with a structure wherein the light emitting device is provided at its front end part, the overall size of the case 101 is large. In order to dispose the light emitting device 103 at a position that is to the front of the case 101 so that it is spaced apart from the part that is grasped by the operator, it is necessary to extend the printed wiring board 102 frontward to the position at which the light emitting device 103 is disposed, and to support, supply power to, and wire the light emitting device 103. Furthermore, all of these elements must be covered and protected an extended case 101.

As a result, it becomes difficult to reduce the weight of the entire remote control transmitter 100 and, as the case 101 is extended frontward of the position at which it is grasped, the case 101 becomes difficult to grasp with one hand and the key switches 104 become difficult to operate with one hand.

Furthermore, the external form of the case 101, which must be made long and thin, governs the exterior design of the entire remote control transmitter 100, and it is therefore not possible to obtain a remote control transmitter of a novel design that sparks consumer interest.

In addition, with a remote control transmitter that comprises the liquid crystal display panel 108 and displays supplemental information about the input operation, as in the conventional remote control transmitter 100 discussed above, installation space is needed so that the liquid crystal display panel 108 can be attached inside the case 101 behind the light emitting device 103, and the case 101 cannot be formed narrowly at the position at which the liquid crystal display panel 108 is attached. Therefore, the case 101 is difficult to grasp with one hand, and there is a risk that the display that is presented by the liquid crystal display panel 108 will be covered by the grasping hand.

Furthermore, with the remote control transmitter 100 that comprises the liquid crystal display panel 108, the light emitting device 103 and the liquid crystal display panel 108 are housed inside the case 101 at different positions, and therefore openings must be provided in the front surface and the face surface of the case 101 for attaching, respectively, the transparent protective filter 107 and transparent protective panel 109, which are prepared separately.

SUMMARY OF THE INVENTION

The present invention was created taking the problems of the conventional art into consideration, and it is an object of the present invention to provide a remote control transmitter such that, even if a light emitting device that emits and outputs an optical control signal is housed inside a case that has been reduced in size, a finger that grasps the case does not block that optical control signal.

It is another object of the present invention to provide a remote control transmitter that has a case that is reduced in size and weight, and with which it is possible to perform an input operation simply while grasping the case with one hand.

It is yet another object of the present invention to provide a remote control transmitter that has a case that can be made compactly and that is easy to grasp with one hand, without providing part of a liquid crystal display panel, an input operating means, or the like in the case.

To achieve the objects discussed above, a remote control transmitter according to a first aspect of the invention comprises: an input device that receives an input operation; a controller in communication with the input device to output a control signal in response to the input operation, a light emitting device, which is housed in a front end part of a case and is in communication with the controller, that emits and outputs an optical control signal toward the front of the case; and a transparent protective filter, which is attached to the transmitter on a front surface of the case, that covers the front of the light emitting device; wherein the transparent protective filter is formed as a strip shaped, long and thin plate that comprises a transparent material having a refractive index that is larger than the refractive index of air; and is attached to the transmitter so that it is oriented frontwards from the front surface of the case so that one end surface in a longitudinal direction of the transmitter opposes the light emitting device; and the optical control signal is emitted and output from a front end surface of the transparent protective filter, which is attached to the case.

The area that surrounds the light emitting device is enclosed by the transparent protective filter, which extends from the case toward a front surface thereof. The light emitting device is thereby isolated from the exterior. The optical control signal, which is emitted from the light emitting device frontwards, transmits from the one end surface of the transparent protective filter, which opposes the light emitting device, through the interior of the transparent protective filter to exit from the front surface.

Most of the optical control signal that impinges the side surfaces of the transparent protective filter from the interior thereof is reflected completely by the side surfaces because the refractive index of the transparent protective filter is larger than that of air and the angle of incidence is larger than the critical angle at the side surfaces. Therefore the optical control signal is emitted frontwards from the front end surface, without leaking to the exterior.

Accordingly, even if the light emitting device is housed in a case that has been reduced in size, the optical control signal is emitted from the front end surface of the transparent protective filter, which is spaced apart from the case frontwards, and the optical control signal is accordingly not blocked by the finger of the operator who grasps the case.

According to a second aspect of the invention, a liquid crystal display panel is attached to and along a back surface side of the transparent protective filter, which is attached to the case so that a face surface of the thin plate is supported horizontally.

The light that passes through the liquid crystal display panel transmits to a face surface side of the transparent protective filter without being completely reflected because the angle of incidence thereat is small, and therefore the prescribed display of the liquid crystal display panel is shown through the transparent protective filter in front of where the case is grasped by the hand.

In addition, the transparent protective filter, which is a thin plate, acts as a transparent protective panel that covers the liquid crystal display panel.

According to a third aspect of the invention, the input device is a transparent touch panel input apparatus, wherein two transparent electrodes are disposed on opposing surfaces of two transparent touch panel sheets, which are stacked so that they are spaced apart by a small gap; on and along the face surface of the transparent protective filter.

The two transparent touch panel sheets, forming a pair of transparent electrodes, are stacked along the face surface of the transparent protective filter, and the liquid crystal display panel is attached along the back surface. Therefore, the input operation on the transparent touch panel input apparatus is performed on the face surface side of the display that is indicated by the liquid crystal display panel.

According to a fourth aspect of the invention, the input device is an electrostatic capacitance switch that detects an input operation based on a change in electrostatic capacitance when a finger of an operator is brought close to a transparent detection electrode; and the transparent detection electrode is attached along the face surface or the back surface of the transparent protective filter. Therefore the input operation on the electrostatic capacitance switch is performed by bringing the finger of the operator close to the face surface side of the display that is shown by the liquid crystal display panel.

According to a fifth aspect of the invention, a lighting element that emits visible light is housed in the front end part of the case so that it opposes the one end surface of the transparent protective filter in the longitudinal direction. The visible light that is emitted from the lighting means passes through the interior of the transparent protective filter, which is thereby tinged with the color of the visible light.

According to a sixth aspect of the invention, the case is formed in a rod shape that is capable of being grasped by one hand of the operator; and the input operating means and the light emitting device in the case are housed so that a battery, which constitutes a drive power source, can be replaced.

The battery is housed inside the rod-shaped case, which can be grasped with one hand.

According to a seventh aspect of the invention, the front end surface of the transparent protective filter is a convex surface or a concave surface.

In the case of a transparent protective filter wherein the rear end surface is a flat surface, if the front end surface is a convex surface, then the transparent protective filter functions as a planoconvex lens; furthermore, if the front end surface is a concave surface, then the transparent protective filter functions as a planoconcave lens.

According to the first aspect of the invention, it is possible to reduce the size and weight of the case so that it can be grasped easily with one hand. Furthermore, even though the case is shaped so that it can be grasped easily, the optical control signal is not blocked by the finger that grasps the case.

In addition, as the transparent protective filter protrudes frontwards from the case, the transmission direction of the optical control signal is clear to the operator, and the optical control signal is not transmitted in the wrong direction. Furthermore, from a functional standpoint, the case is not limited to a long and thin shape, and it is possible to design the case freely with novel external forms that spark consumer interest.

According to the second aspect of the invention, the transparent protective filter can also serve as a transparent protective panel that protects the liquid crystal display panel, thereby reducing the number of parts.

In addition, the liquid crystal display panel is not housed inside the case, which makes it possible to further reduce the size of the case.

According to the third aspect of the invention, the input operation area of the transparent touch panel input apparatus is not provided on the case side, which makes it possible to further reduce the size of the case.

The transparent electrodes of the transparent touch panel input apparatus are disposed on the face surface side of the liquid crystal display panel, and therefore it is possible to perform an input operation on the transparent touch panel input apparatus while looking at the display of the liquid crystal display panel.

The transparent touch panel sheet, whereon the transparent electrodes are formed, is attached along the horizontal face surface of the transparent protective filter, which is attached so that it is oriented proximally frontwards from the case, and therefore the thumb of the hand that grasps the case can perform an input operation by pressing the transparent touch panel sheet.

According to the fourth aspect of the invention, the transparent detection electrode of the electrostatic capacitance switch is not provided on the case side, and therefore it is possible to reduce the size of the case further.

The transparent detection electrode of the electrostatic capacitance switch is disposed on the face surface side of the liquid crystal display panel, and therefore it is possible to perform an input operation by bringing the finger close to the panel while looking at the display thereof.

The transparent detection electrode of the electrostatic capacitance switch is attached along the transparent protective filter, which is attached so that it is oriented frontwards from the case, and the thumb of the hand that holds the case can perform an input operation by approaching the face surface of the transparent protective filter.

According to the fifth aspect of the invention, by controlling the lighting element so that it turns on and tinges the transparent protective filter with a prescribed color, the remote control transmitter obtains a decorative effect.

In addition, if the lighting means is controlled so that it turns on when the input operating means receives an input operation, then the color of the transparent protective filter changes, indicating to the operator that the input operation has been received.

According to the sixth aspect of the invention, the batteries, which each have a rod shaped external form, can be housed inside the rod-shaped case, which is capable of being held with one hand, and therefore it is possible to make the case in a shape that can be grasped with one hand without forming any wasted space inside the case.

According to the seventh aspect of the invention, fabricating the front end surface of the transparent protective filter as a convex surface or a concave surface makes it possible for the infrared control signal to pass through the transparent protective filter, which functions as a planoconvex lens or a planoconcave lens, and either converge or diffuse at the front of the remote control 1. Accordingly, the fabrication of the front end surface of the transparent protective filter makes it possible to transmit the infrared control signal at an arbitrary orientation angle.

BRIEF DESCRIPTION OF THE DRAWINGS

The invention will be more readily apparent from the Detailed Description of the Invention, which proceeds with reference to the drawings, in which.

Figure 1:
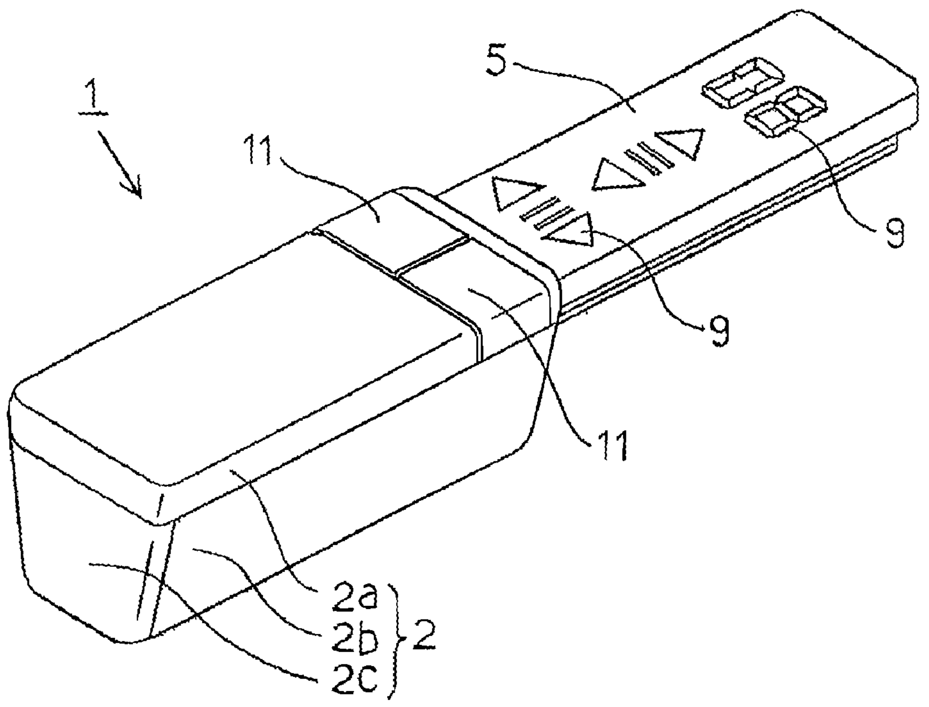
FIG. 1 is an oblique view that shows a diagonal rear view of a remote control transmitter (remote control) 1, from its face surface side, according to one embodiment of the present invention.

In the figures, elements that are repeatedly illustrated are consistently identified by a single reference numeral.

DETAILED DESCRIPTION OF THE PREFERRED EMBODIMENTS

The following table provides a key to some of the reference numerals and elements depicted in the drawings.

1 Remote control transmitter (remote control)
2 Case
4 Battery
5 Transparent protective filter (transparent acrylic plate)
6 Light emitting device (infrared light emitting diode)
7 Input operating means (transparent electrode sheet of the electrostatic capacitance switch)

8 Liquid crystal display device (liquid crystal display panel)
11 Input operating means (pushbutton switch)

Figure 2:
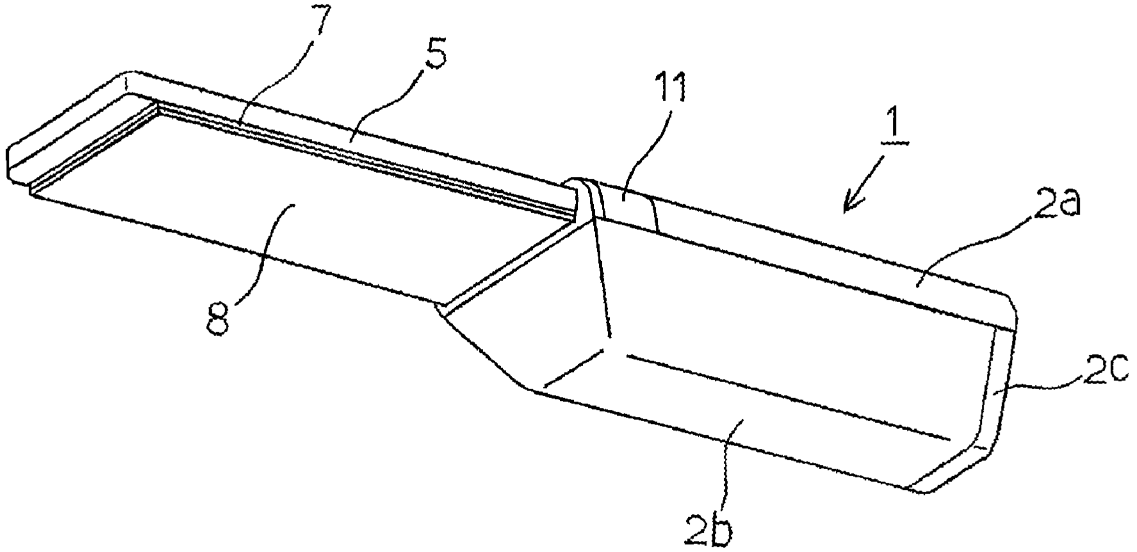
FIG. 2 is an oblique view that shows a diagonal front view of the remote control 1 from its back surface side.
Figure 3:
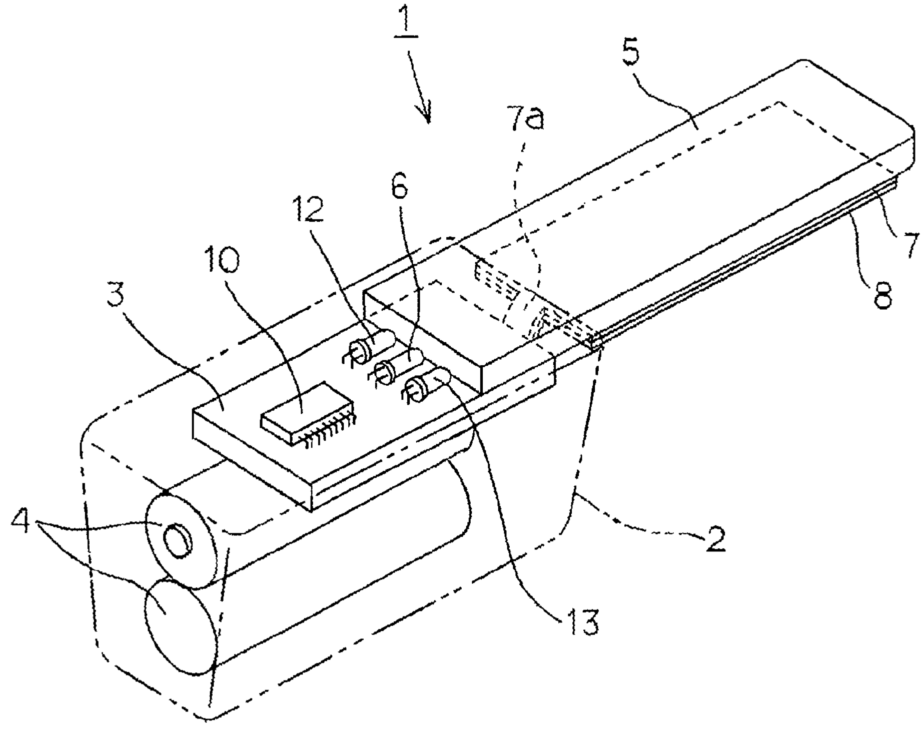
FIG. 3 is an oblique view that shows the configuration of the principal parts of the remote control 1, which is housed in a case 2.
Figure 4:
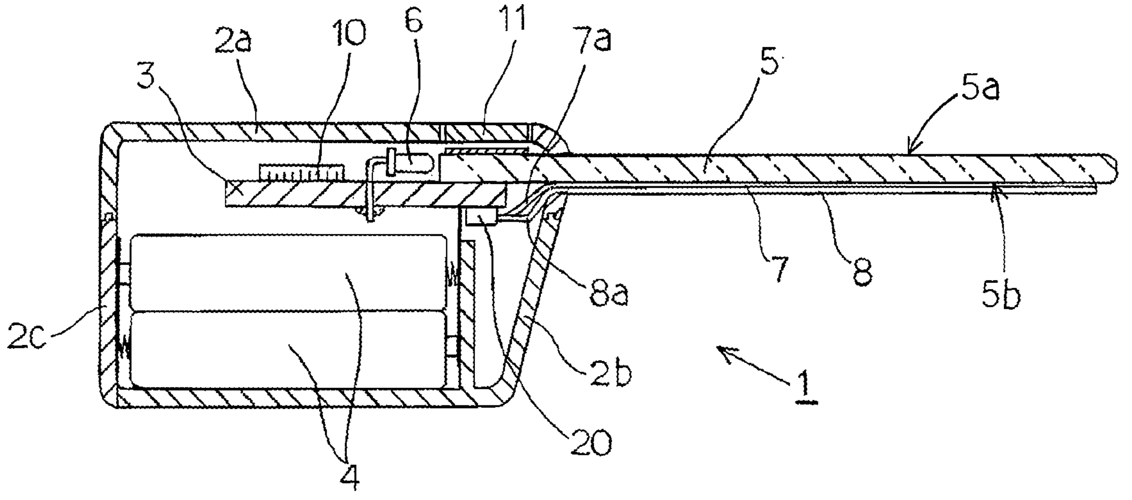
FIG. 4 is a longitudinal cross sectional view of the remote control 1.

A remote control transmitter (hereinbelow, called a remote control) 1 according to the present invention will now be explained, referencing FIG. 1 through FIG. 6. FIG. 1 is an oblique view that shows a diagonal rear view of the remote control 1 from a face surface side, FIG. 2 is an oblique view that shows a diagonal front view of the remote control 1 from a back surface side, FIG. 3 is an oblique view that shows a configuration of the principal parts of the remote control 1, which is housed inside a case 2, FIG. 4 is a longitudinal cross sectional view of the remote control 1. Each part of the remote control 1 will be explained referring to the upper side of FIG. 4 as upward, the lower side as downward, the right side as frontward, and the left side as rearward.

Figure 6:
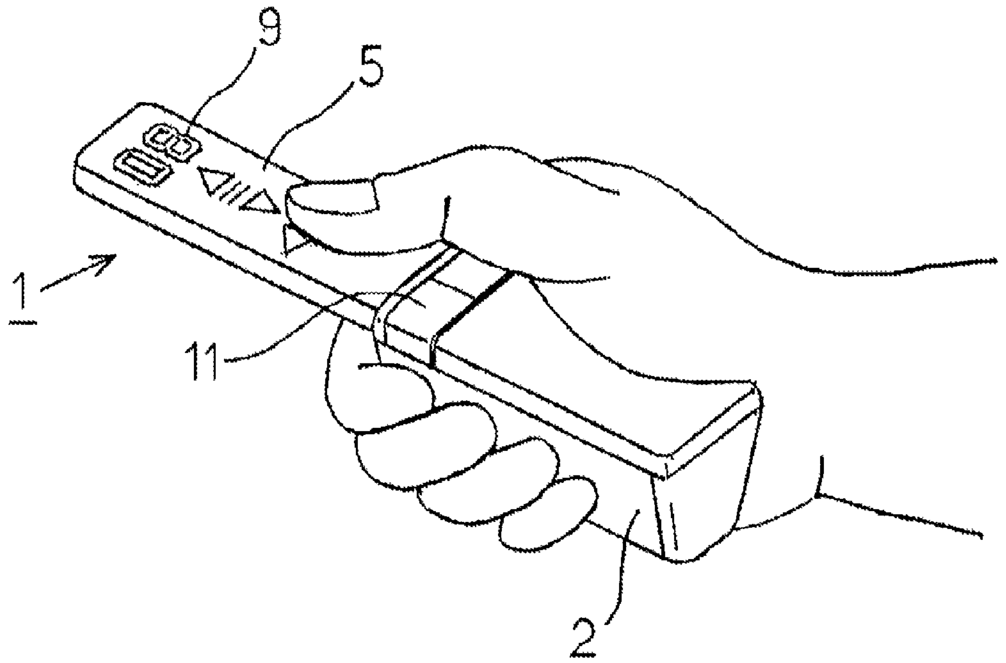
FIG. 6 is an oblique view that shows a state wherein the remote control 1 is being used.
Figure 7:
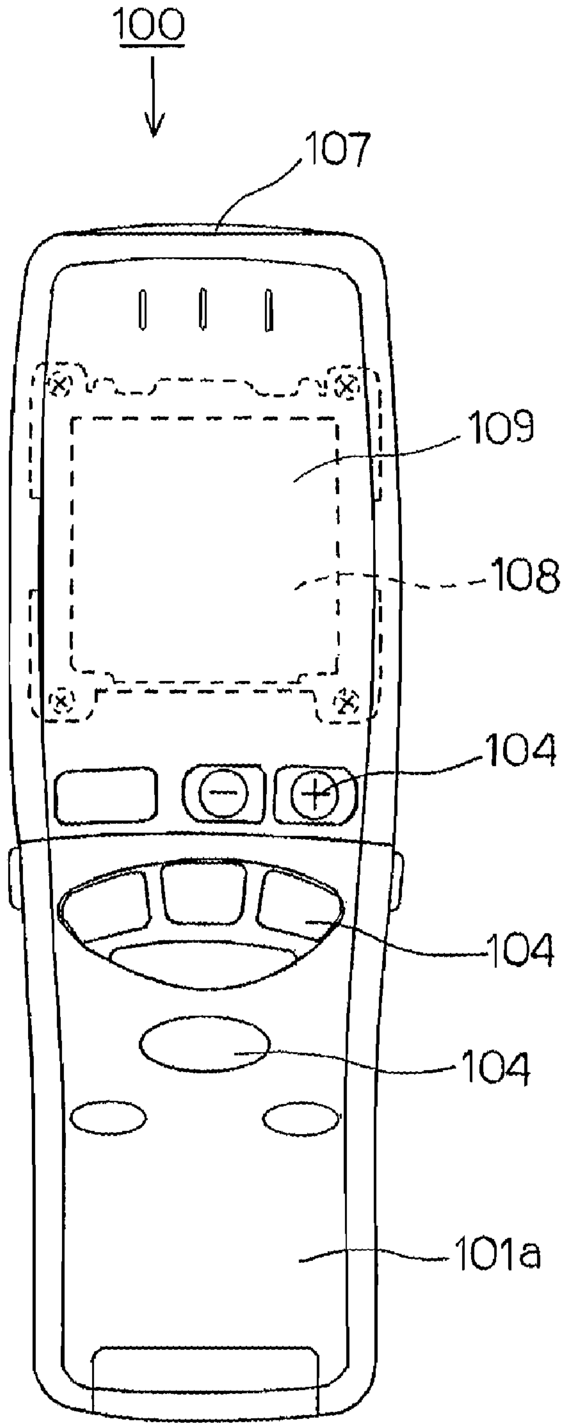
FIG. 7 is a plan view of a conventional remote control transmitter 100.
Figure 8:
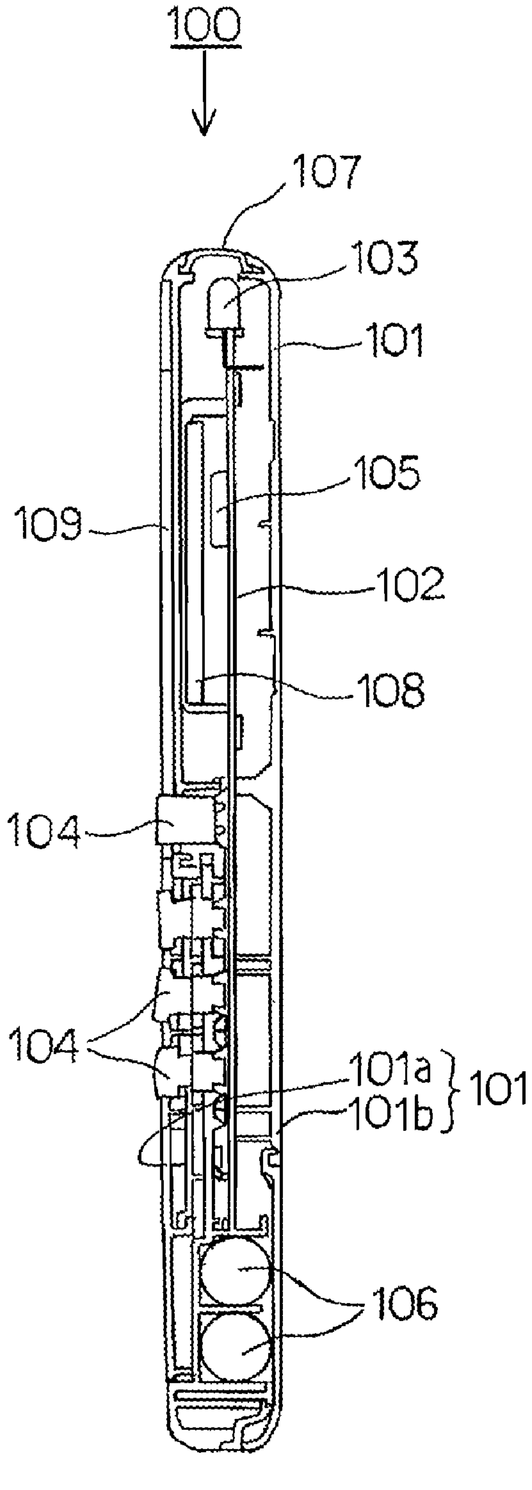
FIG. 8 is a longitudinal cross sectional view of the conventional remote control transmitter 100.

In FIG. 2, the case 2 is an insulating case that is made of synthetic resin and comprises: an upper case 2*a*, a lower case 2*b*, and a cover body 2*c* that detachably engages with the upper case 2*a* and the lower case 2*b*, and, as shown in FIG. 6, the entirety of the case 2 is formed in a square rod shape that can be grasped with one hand.

The interior of the rod shaped case 2 is hollow, and a printed wiring board 3 is supported along an inner top surface of the upper case 2*a*. The lower part of the case 2, which is partitioned off by the printed wiring board 3, comprises a battery housing chamber, wherein two batteries 4 that supply electric power to each part of the remote control 1 are housed. The batteries 4 may, for example, be dry batteries that can be replaced after they have been consumed by detaching the cover body 2*c* that forms a rear wall of the battery housing chamber.

A transparent acrylic plate 5, which is formed as a strip shaped, long and thin plate, is attached to the front of the case 2 so that it protrudes from the case 2 frontwards. As shown in FIG. 4, a rear end part of the transparent acrylic plate 5 is disposed in a gap that is between the inner top surface of the upper case 2*a* and the printed wiring board 3, and is fixed by a fixing means, such as screwing, to the upper case 2*a*. In a state wherein the transparent acrylic plate 5, which protrudes frontwards from a gap that is between the upper case 2*a* and the lower case 2*b*, is fixed to the upper case 2*a*, a face surface 5*a* thereof is supported in a horizontal state.

The transparent acrylic plate 5 is provided and disposed at a position that intersects a light emitting path of an infrared light emitting diode 6, which is housed in the case 2 and is discussed later, functions as a transparent protective filter that protects the infrared light emitting diode 6, and may be formed from, for example, glass or some other plastic material, as long as it is formed from a transparent material and as a strip shaped, long and thin plate.

A transparent electrode sheet 7 of an electrostatic capacitance switch is affixed to and along a back surface 5*b* of the transparent acrylic plate 5. The transparent electrode sheet 7 comprises multiple transparent detection electrodes, which are made of indium tin oxide (ITO) or the like and are not shown, that are printed on a translucent resin sheet; furthermore, as shown in FIG. 4, a flexible tail 7*a* that leads out from the rear end of the transparent electrode sheet 7 is inserted into an flexible printed circuit (FPC) connector 20, which is mounted to a back surface of the printed wiring board 3, and thereby each of the transparent detection electrodes is connected electrically to a microcontroller 10, which is mounted to the printed wiring board 3 and is discussed later.

Further, a reflection type liquid crystal display panel 8 is affixed to a back surface of the transparent electrode sheet 7 so that it is stacked thereunder. The liquid crystal display panel 8 according to the present embodiment may be a dot matrix type liquid crystal display panel and, as shown in FIG. 1, is capable of showing a display 9 of an arbitrary shape on its face surface through the transparent electrode sheet 7 and the transparent acrylic plate 5. A rear end of a flexible tail 8*a*, which leads out from the rear end part of multiple drive electrodes of the liquid crystal display panel 8, is inserted in the FPC connector 20, and thereby each drive electrode of the liquid crystal display panel 8 is connected electrically to the microcontroller 10, which is mounted to the printed wiring board 3.

A key input part, which comprises two pushbutton switches 11 that are disposed laterally, is formed at the front of the case 2 on its face surface side, and is configured so that either of the pushbutton switches 11 can be operated by a pressing operation that is performed by the thumb of the hand that grasps the case 2. Here, the two laterally disposed pushbutton switches 11 may, for example, correspond to control commands that control the power supply of a controlled apparatus so that it turns on and off, respectively.

The infrared light emitting diode 6, which emits an infrared control signal that comprises infrared rays, as well as a blue light emitting diode 12 and a red light emitting diode 13, which emit visible light, are mounted (refer to FIG. 3) to the face surface of the printed wiring board 3 in an area that opposes a rear end surface of the transparent acrylic plate 5, which is attached to the case 2. Each of the diodes 6, 12, 13 are mounted so that the direction in which it emits light is frontward toward the rear end surface of the transparent acrylic plate 5, and thereby the infrared control signal and the visible light that are emitted from the diodes 6, 12, 13 impinge the rear end surface of the transparent acrylic plate 5 and transmit therethrough.

Figure 5:
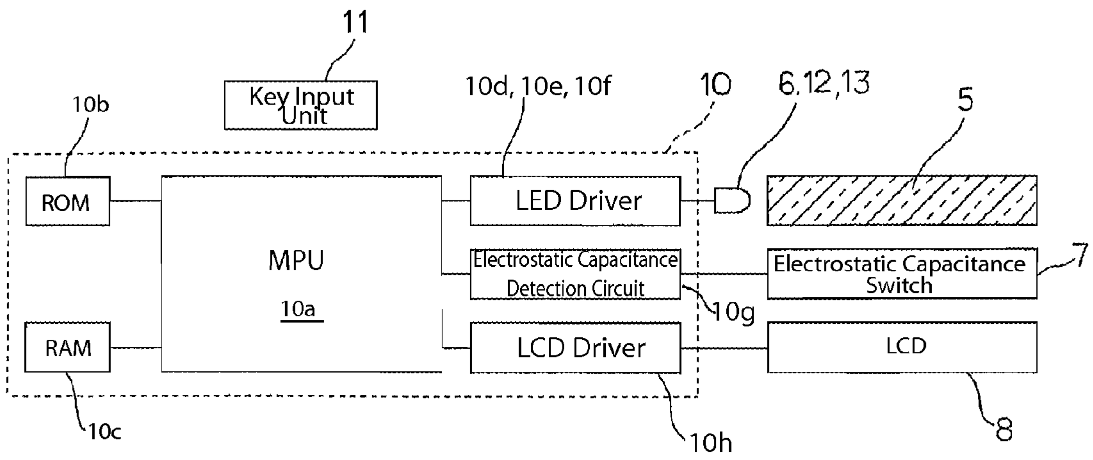
FIG. 5 is a block diagram that shows the principal parts of the remote control 1.

The microcontroller 10, which is provided to the abovementioned remote control 1 and controls the operation of each part thereof, is mounted to the printed wiring board 3. The microcontroller 10 is a single chip implementation of a microprocessor unit (MPU) 10*a*, ROM 10*b*, RAM 10*c*, three types of LED drivers 10*d*, 10*e*, 10*f*, an electrostatic charge detection circuit 10*g*, and an LCD driver 10*h*, which are connected by an internal bus and are shown in FIG. 5.

The LED driver 10*d* is connected to the infrared light emitting diode 6, and the MPU 10*a* controls the infrared light emitting diode 6 so that it flashes. In addition, the LED drivers 10*e*, 10*f* are connected to the blue light emitting diode 12 and the red light emitting diode 13, respectively, and the MPU 10*a* controls the diodes 12, 13 so that they flash. Here, if it is detected that an input operation has been performed on a key input part of one of the push button switches 11, then the MPU 10*a* controls the blue light emitting diode 12 so that it is turned on for a fixed time period. Furthermore, if it is detected that an input operation has been performed on the electrostatic capacitance switch, then the MPU 10*a* controls the red light emitting diode 13 so that it is turned on for a fixed time period. The blue light and the red light that are emitted from the diodes 12, 13, respectively, are transmitted through the interior of the transparent acrylic plate 5, and therefore the transparent acrylic plate 5 is tinged blue or red; thereby, the operator can know that an input operation on one of the abovementioned input operating means has been detected.

The electrostatic charge detection circuit 10*g* is connected to the plurality of the transparent detection electrodes, which are printed on the transparent electrode sheet 7 of the electrostatic capacitance switch, and compares the electrostatic capacitance of each of the transparent detection electrodes with a prescribed value. When the electrostatic capacitance of a transparent detection electrode that the operator's finger has approached exceeds the prescribed value, it is considered that an input operation has been performed on that transparent detection electrode. In addition, the LCD driver 10*h* is connected to each of the drive electrodes of the liquid crystal display panel 8, and therefore is capable of showing the prescribed display 9 on the liquid crystal display panel 8 by outputting a prescribed drive voltage signal to each of the drive electrodes under the control of the MPU 10*a*.

The operation of the remote control transmitter 1 configured in this manner will now be explained. In order to control the power supply of the controlled apparatus so that it turns on, the operator orients the front of the remote control 1 toward the controlled apparatus and presses one of the pushbutton switches 11 with the thumb of the hand that grasps the case 2, whereupon the MPU 10*a*: reads out a control command from the ROM 10*b* that is associated with the key data of the pushbutton switch 11 on which the pressing operation has been performed and that turns the power supply on; and sends a control signal that is modulated with the control command to the LED driver 10*d*. Based on this control signal, the LED driver 10*d* controls the infrared light emitting diode 6 so that it flashes, and therefore an infrared control signal that includes the control command that turns the power supply on is emitted from the LED driver 10*d* frontwards.

The front of the infrared light emitting diode 6 opposes the transparent acrylic plate 5, and therefore the infrared control signal impinges the rear end surface of the transparent acrylic plate 5 and transmits therethrough.

The refractive index of the transparent acrylic plate 5 is preferably in the range of 1.5 to 1.7, which is greater than the refractive index of air (1.0), and therefore, because the angle of incidence with respect to the side surfaces (the surfaces parallel to the longitudinal directions) is greater than the critical angle, the majority of the infrared control signal that transmits through the interior of the transparent acrylic plate 5, which is formed in a rectangular parallelepiped, from its rear end surface is completely reflected without any leakage from the side surfaces, and is emitted frontward from the front end surface, which is the other end surface of the transparent protective filter. Thereby, the controlled apparatus, which is located to the front of the remote control 1, receives the infrared control signal and, based on the control command obtained by demodulation, executes the operation of turning the power supply on.

In addition, when the MPU 10*a* of the remote control 1 detects the pressing of one of the pushbutton switches 11, it reads out the abovementioned control command and outputs a control signal to the LED driver 10*e* that controls the blue light emitting diode 12 so that it turns on. By turning the blue light emitting diode 12 on for a prescribed time period, blue light transmits through the interior of the transparent acrylic plate 5 from its rear end surface, and thereby the transparent acrylic plate 5 is tinged blue. The blue light that is emitted from the blue light emitting diode 12 reaches the controlled apparatus, which the remote control 1 faces; however, in order to prevent mistaken operation caused by natural light or the like, the controlled apparatus receives only infrared control signals that pass through a filter, which passes only infrared light, and therefore natural light or the like does not affect demodulation that is performed by the controlled apparatus.

Furthermore, when the MPU 10*a* of the remote control 1 outputs a control signal that is modulated with the control command to the LED driver 10*d*, it outputs a drive voltage signal, from the LCD driver 10*h* to the liquid crystal display panel 8 which shows a display that is related to that control command. Here, the control command is one that controls the power supply of the controlled apparatus so that it turns on, and the display 9 shown in FIG. 1, which indicates the details of control that can be performed on the controlled apparatus to which the power supply has been turned on, is shown via the liquid crystal display panel 8.

The display 9 that is shown by the liquid crystal display panel 8 can be viewed by the operator from above through the transparent electrode sheet 7 and the transparent acrylic plate 5; therefore, for example, while looking at a portion of the display that shows the details of the control that is about to be performed, the operator brings his or her thumb close to the area thereabove, as shown in FIG. 6. The approach of the thumb increases the electrostatic capacitance of the transparent detection electrode of the transparent electrode sheet 7 that is formed therebelow, and when that electrostatic capacitance exceeds the prescribed value, the electrostatic charge detection circuit 10*g* determines that an input operation has been performed on that transparent detection electrode and outputs an input operation detection result to the MPU 10*a*. Similar to the case wherein the pressing of one of the pushbutton switches 11 is detected, the MPU 10*a* reads out a control command from the ROM 10*b* that is associated with the input operation that was performed on that transparent detection electrode, outputs a control signal to the LED driver 10*d* that is modulated with the control command, and outputs a control signal to the LED driver 10*f* that controls the red light emitting diode 13 so that it turns on.

Thereby, similar to that discussed above, an infrared control signal that includes the control command is emitted from the front end surface of the transparent acrylic plate 5 toward the controlled apparatus, and the transparent acrylic plate 5 is tinged red by the red light that is emitted from the red light emitting diode 13.

In the embodiment discussed above, the transparent electrode sheet 7 of the electrostatic capacitance switch is affixed to the back surface 5*b* of the transparent acrylic plate 5, but it may alternatively be affixed to the face surface 5*a*.

In addition, the above was explained using an electrostatic capacitance switch, wherein the transparent electrode sheet 7 is affixed to the transparent acrylic plate 5, as one example of an input operating means wherein an input operation area is formed on the transparent acrylic plate 5 side outside of the case 2; however, the input operating means may alternatively be a transparent touch panel input apparatus wherein two transparent electrodes are disposed opposingly on opposing surfaces of two transparent touch panel sheets, which are stacked so that they are spaced apart by a small gap. If the transparent touch panel input apparatus is used as the input operating means, then the two stacked transparent touch panel sheets are affixed along the face surface 5*a* of the transparent acrylic plate 5, and numerous pairs of transparent electrodes are formed on the opposing surfaces of the transparent touch panel sheets. If the operator presses the touch panel sheet on its upper side while looking at the display of the liquid crystal display panel 8, which is shown through the transparent acrylic plate 5 and the two touch panel sheets, contact is made between the transparent electrodes that are disposed opposingly at the pressing position, and it is possible to detect the input operation that was performed at that pressing position based on that contact.

In addition, the liquid crystal display panel 8 discussed above is a reflection type, but it may alternatively be a transmissive type. If a transmissive type liquid crystal display panel 8 is used, then it is preferable in addition to mount a light emitting device that constitutes a backlight light source to the printed wiring board 3, and to dispose a light guiding plate, which diffuses the backlight, on the back side of the liquid crystal display panel 8.

It is within the scope of the present invention to include all foreseeable equivalents to the elements of the present invention as described with reference to FIGS. 1-6. The examples provided are not to be interpreted as limiting the invention beyond what is claimed. The examples may also be extended in a great variety of ways. For example, notwithstanding the details discussed above, the timing of the light emission of, for example, the blue light emitting diode 12 or the red light emitting diode 13 may instead be arbitrary, and the display 9 of the liquid crystal display panel 8 may also be arbitrary and therefore not limited to the details suggested by the transmitted control command.

As discussed above, the control command is transmitted to the controlled apparatus by an infrared control signal. The present invention however is not limited to a control signal that is transmitted by infrared rays, as long as it is an optical control signal transmissible through the transparent acrylic plate 5.

As discussed above, the front end surface and the rear end surface of the transparent acrylic plate 5, which is a transparent protective filter, are formed as flat surfaces. Either one or both of these surfaces may alternatively be fabricated convexly or concavely, enabling the transparent acrylic plate 5 may function as a convex lens, a concave lens, or the like. If just the front end surface of the transparent acrylic plate 5, wherein the rear end surface is a flat surface, is fabricated as a convex surface or a concave surface, then it functions as a planoconvex lens or a planoconcave lens. If the front end surface of the transparent acrylic plate 5 is a convex surface, then the transparent acrylic plate 5 functions as a planoconvex lens, and the infrared control signal that is emitted from the infrared light emitting diode 6 and that passes through the transparent acrylic plate 5 is emitted so that it converges from the front end surface. Accordingly, with a remote control 1 that is used frequently at a position that is distant from the controlled apparatus, it is preferable to make the front end surface a convex surface. In addition, if the front end surface of the transparent acrylic plate 5 is fabricated conversely as a concave surface, then the transparent acrylic plate 5 functions as a planoconcave lens, and the infrared control signal that passes through the transparent acrylic plate 5 is emitted so that it is diffused from the front end surface. Accordingly, with a remote control 1 that controls a controlled apparatus over a wide range of orientation angles without regard to the orientation of the remote control 1, it is preferable to make the front end surface a concave surface.

The invention claimed is:

1. A remote control transmitter, comprising:

an input device that receives an input operation;

a controller in communication with the input device to output a control signal in response to the input operation;

a light emitting device, which is housed in a front end part of a case and is in communication with the controller, that emits and outputs an optical control signal toward the front of the case in response to the control signal; and a transparent protective filter, which is attached to the transmitter on a front surface of the case, that covers the front of the light emitting device;

wherein: the transparent protective filter is formed as a strip shaped, long and thin plate that comprises a transparent material having a refractive index that is larger than the refractive index of air, and is attached to the transmitter so that it is oriented frontwards from the front surface of the case, such that a rear end surface of the transparent protective filter in a longitudinal direction of the transmitter opposes the light emitting device;

the optical control signal is emitted and output from a front end surface of the transparent protective filter, which is attached to the case; and a liquid crystal display panel attached to and along a back surface side of the transparent protective filter, the panel being attached to the case so that a face surface of the plate is supported horizontally by the panel, wherein:

the input device comprises a transparent touch panel input apparatus, having two transparent electrodes that are disposed on opposing surfaces of two transparent touch panel sheets, which are stacked on and along the face surface of the transparent protective filter so that they are spaced apart by a small gap.

2. A remote control transmitter, comprising:

an input device that receives an input operation;

a controller in communication with the input device to output a control signal in response to the input operation;

a light emitting device, which is housed in a front end part of a case and is in communication with the controller, that emits and outputs an optical control signal toward the front of the case in response to the control signal; and a transparent protective filter, which is attached to the transmitter on a front surface of the case, that covers the front of the light emitting device;

wherein: the transparent protective filter is formed as a strip shaped, long and thin plate that comprises a transparent material having a refractive index that is larger than the refractive index of air, and is attached to the transmitter so that it is oriented frontwards from the front surface of the case, such that a rear end surface of the transparent protective filter in a longitudinal direction of the transmitter opposes the light emitting device:

the optical control signal is emitted and output from a front end surface of the transparent protective filter, which is attached to the case; and a liquid crystal display panel attached to and along a back surface side of the transparent protective filter, the panel being attached to the case so that a face surface of the plate is supported horizontally by the panel, wherein:

the input device is an electrostatic capacitance switch that detects an input operation based on a change in electrostatic capacitance when a finger of an operator is brought close to a transparent detection electrode of the electrostatic capacitance switch, wherein the transparent detection electrode is attached along a face surface or a back surface of the transparent protective filter.

3. The remote control transmitter according to claim 1, further comprising:

a lighting element that is housed in the front end part of the case so that it opposes the one end surface of the transparent protective filter in the longitudinal directions, the lighting element being configured in communication with the controller to receive a second control signal for driving the lighting element to emit visible light.

4. The remote control transmitter according to claim 1, wherein:

the case is formed in a shape that is capable of being grasped by one hand of the operator; and the input device and the light emitting device in the case are housed so that a battery, which constitutes a drive power source, can be replaced.

5. The remote control transmitter according to claim 1, wherein:

the front end surface of the transparent protective filter for outputting the optical control signal is a convex surface or a concave surface.

6. The remote control transmitter according to claim 1, wherein the liquid crystal display panel is configured to be in communication with the controller to receive a third control signal for driving the liquid crystal display panel.

7. The remote control transmitter according to claim 2, further comprising:

a lighting element that is housed in the front end part of the case so that it opposes the one end surface of the transparent protective filter in the longitudinal directions, the lighting element being configured in communication with the controller to receive a second control signal for driving the lighting element to emit visible light.

8. The remote control transmitter according to claim 2, wherein:

the case is formed in a shape that is capable of being grasped by one hand of the operator; and the input device and the light emitting device in the case are housed so that a battery, which constitutes a drive power source, can be replaced.

9. The remote control transmitter according to claim 2, wherein:

the front end surface of the transparent protective filter for outputting the optical control signal is a convex surface or a concave surface.

10. The remote control transmitter according to claim 2, wherein the liquid crystal display panel is configured to be in communication with the controller to receive a third control signal for driving the liquid crystal display panel.

* * * * *